June 15, 1948. W. FLAJOLE 2,443,348
SINGLE RUNNER SLED
Filed March 16, 1946
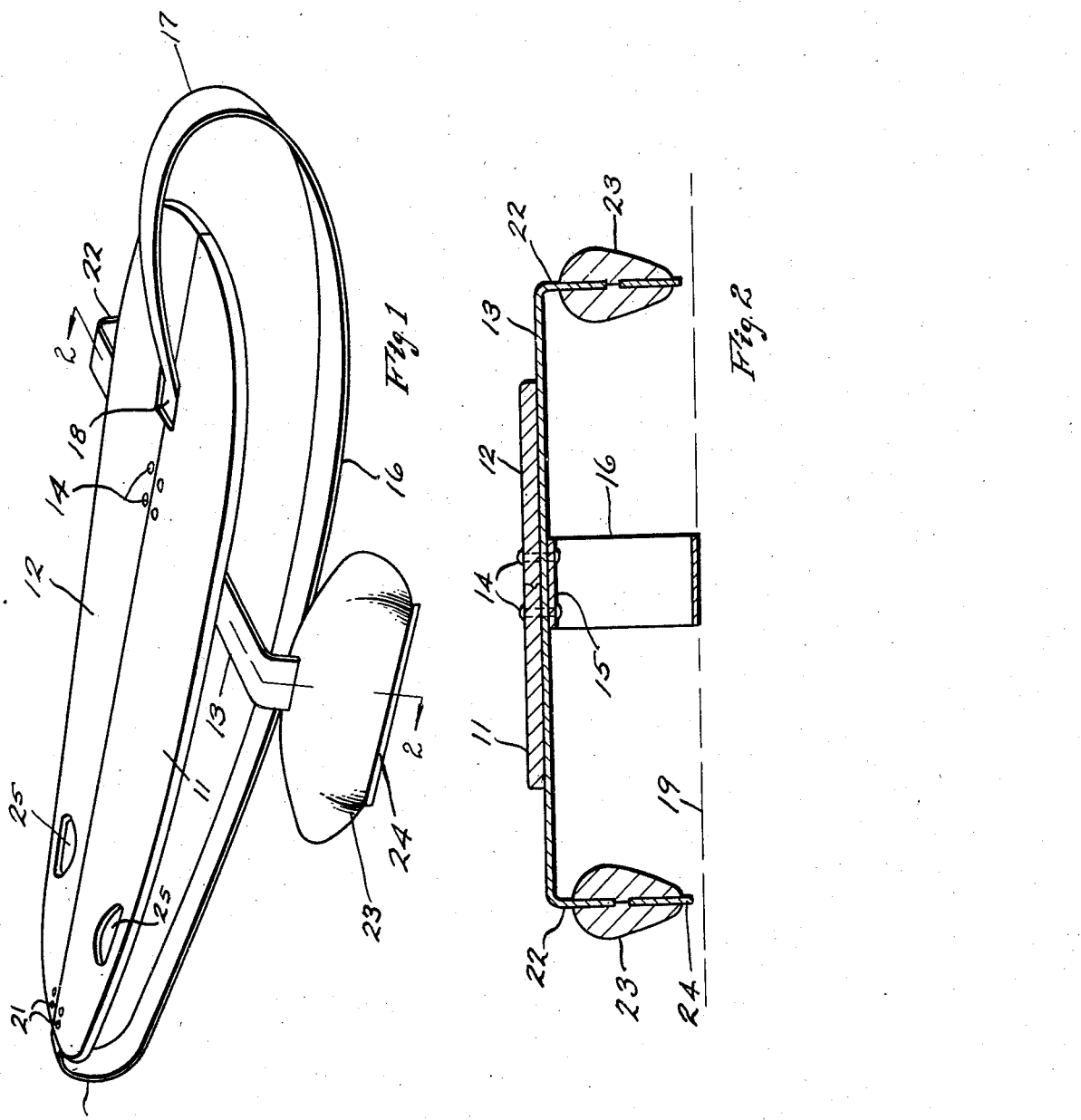
INVENTOR
WILLIAM FLAJOLE
BY
Robert A. Sloman
ATTORNEY Patented June 15, 1948

2,443,348

UNITED STATES PATENT OFFICE 2,443,348

SINGLE RUNNER SLED

William Flajole, Detroit, Mich.

Application March 16, 1946, Serial No. 654,860

6 Claims. (Cl. 280—12)

1

This invention relates to a single runner sled and more particularly to a single runner sled provided with a pair of spaced oppositely arranged outriggers.

It is the object of the present invention to provide a single runner outrigger sled of simplified construction consisting of a minimum of parts, with accompanying low cost of manufacture.

It is the further object of this invention to provide a sled wherein the single runner is formed by looping a steel slat at one end over the front portion of the sled platform to which it is secured, and with its other end curved upwardly and inwardly for attachment to the rear portion of the sled platform.

It is the further object of this invention to provide a transverse outrigger support which provides a central mounting and support for the sled platform, and also provides a means of attachment for the forward looped portion of the sled runner.

These and other objects will be seen from the following specification and claims in conjunction with the appended drawing in which:

Fig. 1 is a perspective view of the single runner outrigger sled; and

Fig. 2 is an elevational section on line 2—2 of Fig. 1.

It will be understood that the above drawing illustrates one preferable embodiment of the invention, and that other embodiments are contemplated within the scope of the claims hereinafter set out.

Referring to the drawings, the single runner sled consists of the platform or seat members 11 and 12 which may be unitary if desired, and which are forwardly mounted and horizontally supported upon transverse outrigger carrier 13.

As illustrated in Fig. 2 rivets 14 extend through seat member 11—12, through outrigger carrier 13, and through the formed end portion 15 of runner 16.

Runner 16 formed from a unitary slat, preferably of spring steel, is substantially flat throughout its length, and is looped rearwardly at 17. Portion 17 extends through opening 18 in platform 11—12 and its end portion 15 extends below outrigger carrier 13 to which it is riveted as above described and illustrated in the drawing.

Runner 16 is adapted to bear on the ground or other surface indicated at 19 in Fig. 2 throughout the central portion of its length, while its end portion is upwardly and inwardly curved at

2

20 and secured to the underside of platform 11—12 at its rear end by rivets 21.

Thus it appears that platform 11—12 is supported forwardly and rearwardly by the end portions 15 and 20 respectively of formed runner 16. It will be noted, however, that further lateral support is given to platform 11—12 by the outrigger carrier 13 which is transversely interposed between said platform and the front end 15 of runner 16.

The end portions 22 of carrier 13 are bent downwardly and supportingly extend within corresponding openings formed within outriggers 23, best illustrated in Fig. 2. It will be noted that outriggers are streamlined in appearance, being substantially tear-drop in shape.

Blades 24 preferably metallic, are supportingly carried longitudinally within corresponding slots formed within the bottom portions of outriggers 23. As shown in Fig. 2, when the sled is traveling in proper balance, the bottom surfaces of blades 24 are above the ground surface 19 to minimize friction but at the same time are available to support the sled approximately in a level position when balance is lost. With the sled supported by the runner as well as one outrigger it will be seen that the angle of inclination is relatively slight preventing the rider from falling off. However, under speed and proper balance, and particularly in traveling down inclines, it is desirable that the sled travel only on the central runner.

With a little practice the rider will be able to attain the proper balance so that for most efficient travel only the central runner 16 will be used.

Because of the spring characteristics of the formed runner 16 a floating effect is given to the sled platform, with some relative vertical reciprocation thereof as the sled proceeds.

Openings 25 are formed within platform 11—12 and have several functions. The sled may be carried by inserting one or both hands of the user through one or both of openings 25; or on the other hand, the rider's toes may project through said openings when travelling on one's chest. While said openings are shown positioned rearwardly of the sled platform, it is contemplated that said openings may be positioned otherwise if desired, as for instance, more centrally.

Having described my invention, reference should now be had to the claims which follow for determining the scope thereof.

I claim:

1. A single runner sled comprising a platform, a supporting transverse outrigger carrying member thereunder, and a single central supporting runner, the front end of which is looped rearwardly over the front portion of said platform and secured to said outrigger carrying member, and the rear end portion of which is forwardly curved and secured to the rear portion of said platform.

2. A single runner sled comprising a platform, a supporting transverse outrigger carrying member thereunder, a single central supporting runner, the front end of which is looped rearwardly over the front portion of said platform and secured to said outrigger carrying member, and the rear end portion of which is forwardly curved and secured to the rear portion of said platform, and securing means extending through said platform, through said member, and through the front end portion of said runner.

3. A single runner sled comprising a platform, a supporting transverse outrigger carrying member thereunder, and a single central supporting runner, the front end of which is looped rearwardly over the front portion of said platform, extends through an opening therein, and is secured to said outrigger carrying member, and the rear end portion of which is forwardly curved and secured to the under side of the rear portion of said platform.

4. A single runner sled comprising a platform, a supporting transverse outrigger carrying member thereunder, a single central supporting runner, the front end of which is looped rearwardly over the front portion of said platform, extends through an opening therein, and is secured to said outrigger carrying member, and the rear end portion of which is forwardly curved and secured to the under side of the rear portion of said platform, and securing means extending through and joining said platform, said member, and the front end portion of said runner.

5. A single runner sled comprising a platform, a supporting transverse outrigger carrying member thereon, a single central supporting runner, the opposite ends of which are inwardly curved and joined to opposite ends of said platform, outriggers carried by and depending from opposite ends of said member, and runner blades carried within openings in the bottom of said outriggers.

6. A single runner sled comprising a platform, a supporting transverse outrigger carrying member thereunder, a single central supporting runner, the opposite ends of which are inwardly curved and joined to opposite ends of said platform, outriggers carried by and depending from opposite ends of said member, and runner blades carried within openings in the bottom of said outriggers, the bottom supporting edges of said blades lying in an elevated plane in spaced relation to the plane of the runner.

WILLIAM FLAJOLE.

REFERENCES CITED

The following references are of record in the file of this patent:

UNITED STATES PATENTS

| Number | Name | Date |
|---|---|---|
| 664,215 | Hickson | Dec. 18, 1900 |
| 1,435,484 | Landzettel | Nov. 14, 1922 |

FOREIGN PATENTS

| Number | Country | Date |
|---|---|---|
| 48,291 | Switzerland | Nov. 15, 1909 |
| 64,811 | Switzerland | Apr. 8, 1913 |
| 248,189 | Germany | June 14, 1912 |